United States Patent [19]
Halder

[11] Patent Number: 5,279,493
[45] Date of Patent: Jan. 18, 1994

[54] POSITION DETECTOR FOR WORKPIECE-MACHINING APPARATUS

[75] Inventor: Werner Halder, Achstetten-Bronnen, Fed. Rep. of Germany

[73] Assignee: Erwin Halder KG, Achstetten-Bronnen, Fed. Rep. of Germany

[21] Appl. No.: 988,174

[22] Filed: Dec. 9, 1992

[30] Foreign Application Priority Data

May 4, 1992 [DE] Fed. Rep. of Germany ....... 4214320

[51] Int. Cl.$^5$ .............................................. B25B 11/00
[52] U.S. Cl. .................................................... 269/329
[58] Field of Search ................ 279/126, 4.02; 483/68; 29/25, 26; 144/278 A; 83/451, 360; 269/329, 20, 21, 23, 303, 315

[56] References Cited

U.S. PATENT DOCUMENTS

| | | | |
|---|---|---|---|
| 3,577,617 | 5/1971 | Hurle | 483/68 |
| 4,480,366 | 11/1984 | Takahashi et al. | 29/26 A |
| 4,645,220 | 2/1987 | Hiestand | 279/126 |
| 4,693,458 | 9/1987 | Lewecke et al. | 269/329 |
| 4,909,521 | 3/1990 | Ovanin | 279/126 |

FOREIGN PATENT DOCUMENTS 3226664  2/1983  Fed. Rep. of Germany .
3341542  5/1985  Fed. Rep. of Germany .

*Primary Examiner*—Robert C. Watson
*Attorney, Agent, or Firm*—Herbert Dubno; Andrew Wilford

[57] ABSTRACT

A workpiece-position detector used in combination with a workpiece having a face and with a support having a surface adapted to engage the workpiece face has an element at the surface formed with a passage having a mouth open generally at the surface and blockable by the face of the workpiece, a flexible hose connected to the passage of the element, and a feed line connected to the hose. A pump connected to the feed line supplies a gas under pressure to the hose so that the gas exits from the passage mouth when same is not blocked. A restriction is provided in the feed line and a pressure sensor in the feed line downstream of the restriction produces an output corresponding to pressure in the conduit so that when the mouth is blocked the pressure at the sensor is relatively high and when not blocked it is relatively low. A controller connected to the pressure sensor takes action when the pressure sensor detects the relatively low pressure.

7 Claims, 4 Drawing Sheets

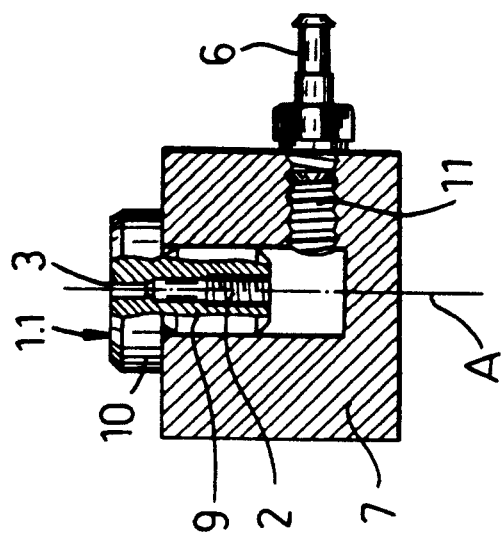
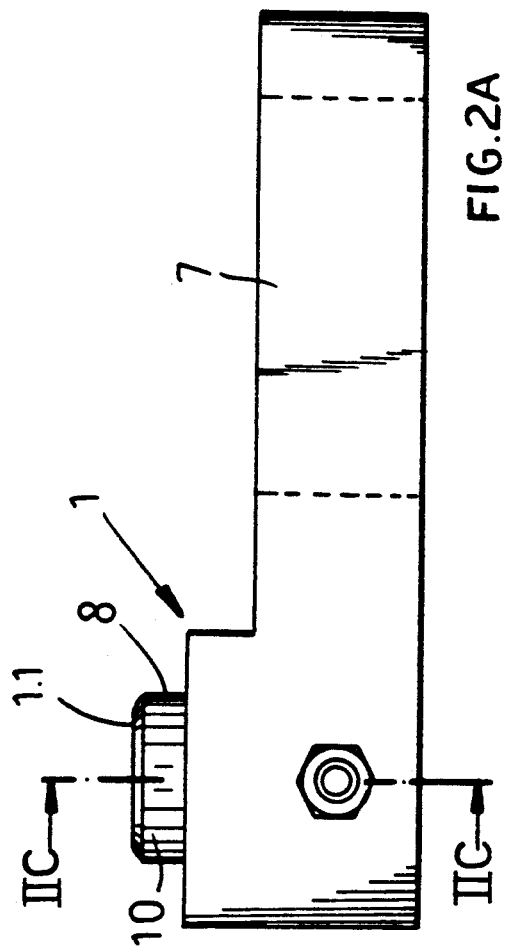
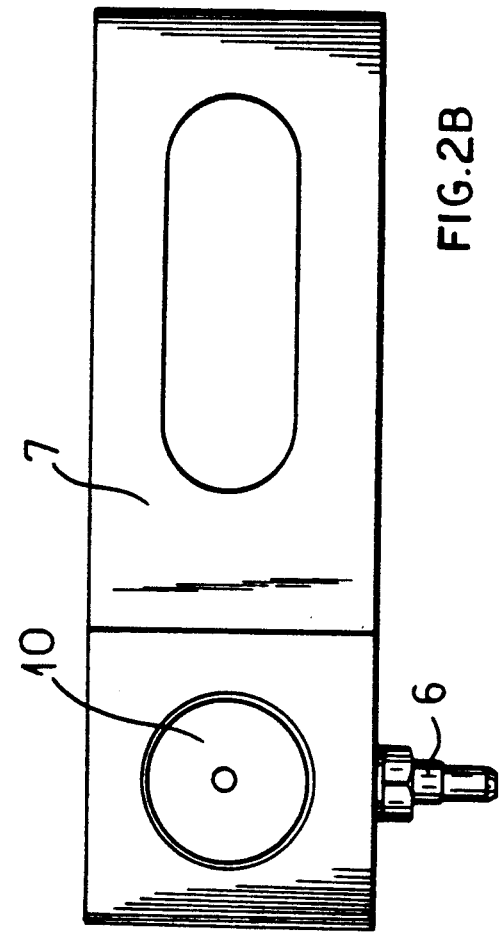

5,279,493

POSITION DETECTOR FOR WORKPIECE-MACHINING APPARATUS

FIELD OF THE INVENTION

The present invention relates to a workpiece-position detector. More particularly this invention concerns such a detector used in a workpiece-machining apparatus.

BACKGROUND OF THE INVENTION

In an automated workpiece-machining apparatus it is important that the controller for the machine be able to verify whether or not the workpiece is in the proper position for machining. If the workpiece is not in place at all or out of position somewhat, substantial damage could occur when a machining operation is attempted.

Typically the workpiece is moved horizontally into position against a vertical support, to which it is secured by some form of clamp. In this arrangement the workpiece is forcibly pressed horizontally against the position detector.

When, however, the workpiece is on a horizontal support surface, the situation is somewhat more difficult to monitor, as normally only the workpiece weight is effective downward, the clamping force frequently remaining horizontal. To do this a thin metal foil is used as a position detector to check any gap between the workpiece and the support. Such a position detector is hard to use.

OBJECTS OF THE INVENTION

It is therefore an object of the present invention to provide an improved position detector for a workpiece-machining apparatus.

Another object is the provision of such an improved position detector for a workpiece-machining apparatus which overcomes the above-given disadvantages, that is which is automatic and easy to use.

SUMMARY OF THE INVENTION

The instant invention is used in combination with a workpiece having a face, and a support having a surface adapted to engage the workpiece face. It is a workpiece-position detector having an element at the surface formed with a passage having a mouth open generally at the surface and blockable by the face of the workpiece, a flexible hose connected to the passage of the element, and a feed line connected to the hose. A pump connected to the feed line supplies a gas under pressure to the hose so that the gas exits from the passage mouth when same is not blocked. A restriction is provided in the feed line and a pressure sensor in the feed line downstream of the restriction produces an output corresponding to pressure in the conduit so that when the mouth is blocked the pressure at the sensor is relatively high and when not blocked it is relatively low. A controller connected to the pressure sensor takes action when the pressure sensor detects the relatively low pressure.

The advantage of the invention is that it is relatively easy to monitor a plurality of different position detectors, only paying attention to those detectors which are supposed to be blocked by the workpiece. Thus the entire workpiece support surface can be provided with a dense array of such detectors, and the computer-type controller can be easily programmed to only monitor those that are blocked when the workpiece is perfectly positioned. On the other hand when a single detector reports that it is not blocked, the controller knows something is amiss and can shut down the machining apparatus or prevent it from starting at all.

Thus according to the invention the surface is provided with a plurality of such detectors all connected via respective such hoses and feed lines to the pump. Each such feed line is provided with a respective such restriction and sensor.

Normally in accordance with this invention the passage is restricted at its mouth. Furthermore the surface has a predetermined area and the mouth has a flow cross section equal to at most about one one-hundredth of the predetermined surface area. This maintains a predetermined pressure in the hose right up to the working area, regardless of the hose length. The element passage is L-shaped with one leg forming the mouth and another leg provided with a connection to which the hose is secured. This makes it easy to route the hose so that it does not interfere with the machining apparatus.

In accordance with further features of the invention the element includes a block formed with the passage and a plug formed with a central throughgoing passage and having a small-diameter stem fitting snugly in the passage and a large-diameter head projecting from the block and forming part of the surface.

Another system according to this invention has an element formed with a part-spherical seat and including a part-spherical body having a body face and engaged in the seat. The body is movable between a blocking position with the body face parallel to the surface and blocking flow out of the passage and a vent position with the body face nonparallel to the surface and permitting flow out of the passage. The element is formed with a bleed orifice opening into the seat and communicating the passage in the vent position of the body.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 2A is a side view of a position-detector element according to the invention;

FIG. 2B is a top view of the detector element;

FIG. 2C is a section taken along line IIC—IIC of FIG. 2A;

SPECIFIC DESCRIPTION

Figure 1:
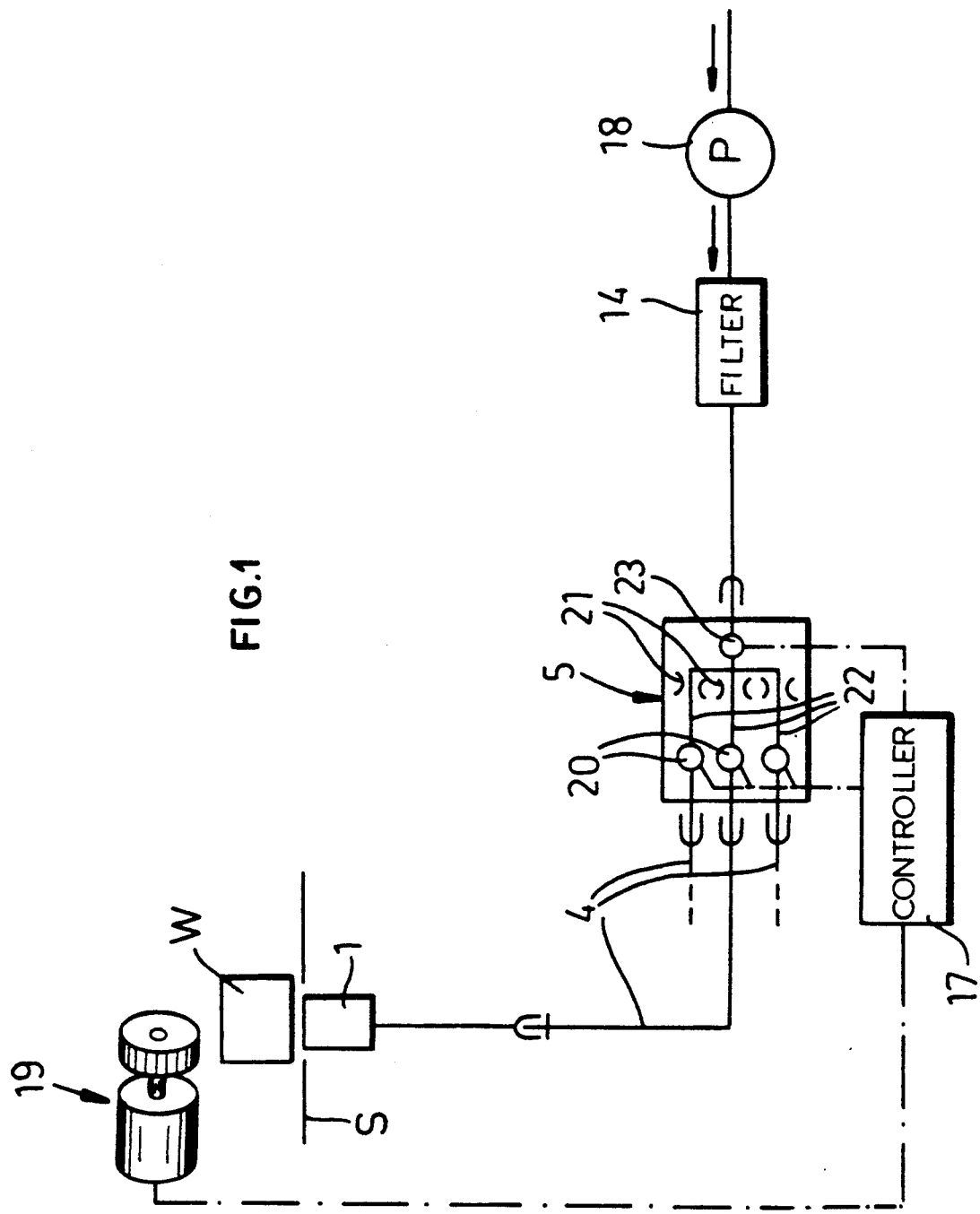
FIG. 1 is a largely schematic diagram illustrating the system of this invention.

As seen in FIG. 1 a workpiece W is supposed to sit on a surface S adjacent a machining tool 19, here a grinder, controlled by a computer-type controller 17. An array of position-detector elements 1 (only one shown) is recessed in the surface S and these elements 1 are connected via respective flexible hoses 4 to respective feed lines 22 of a monitoring unit 5. These lines 22 are in turn all pressurized through a filter 14 from a pump 18 with a gas, normally air.

According to the invention each feed line 22 is provided with a flow restriction 21 and, immediately downstream therefrom but upstream of the respective hose 4, with a respective pressure sensor 20 connected to the controller 17. Another pressure sensor 23 also connected to the controller 17 is provided upstream of the restrictions 21 where the lines 22 join.

When flow out of one of the elements 1 is blocked by the workpiece W, pressure in the respective hose 4 and line 22 will be the same as the upstream pressure at the sensor 23. The controller 17 will compare the outputs of the two sensors 20 and 23 to determine this equivalency, and will therefore know that the workpiece W is properly seated on the respective element 1.

When, however, the workpiece W is not seated flatly on one of the elements 1 to prevent venting of gas from it, the pressure in the respective hose 4 and line 22 downstream of the respective restriction 21 will be much lower than the pressure upstream of this restriction 21. The controller 17 will, by comparing the outputs of the sensors 20 and 23, be able to react to this differential by preventing operation of the machining tool 19 until it determines that the workpiece W is in the desired position, when seated on all of the elements 1.

As seen in FIGS. 2A through 2C the position-detecting element 1 basically comprises a block 7 formed with an L-shaped passage 11 having a horizontal leg provided with a nipple 6 to which the respective hose 4 is connected and a vertical leg in which is fitted a small-diameter stem 9 of a plug 8 having a large-diameter head 10 forming a support surface 1.1. A restricted passage 2 centered on an axis A vertically traverses the plug 8 and has an upper end forming a mouth 3 at the surface 1.1. This surface 1.1 is set flush with or defines the surface S of FIG. 1.

Figure 3:
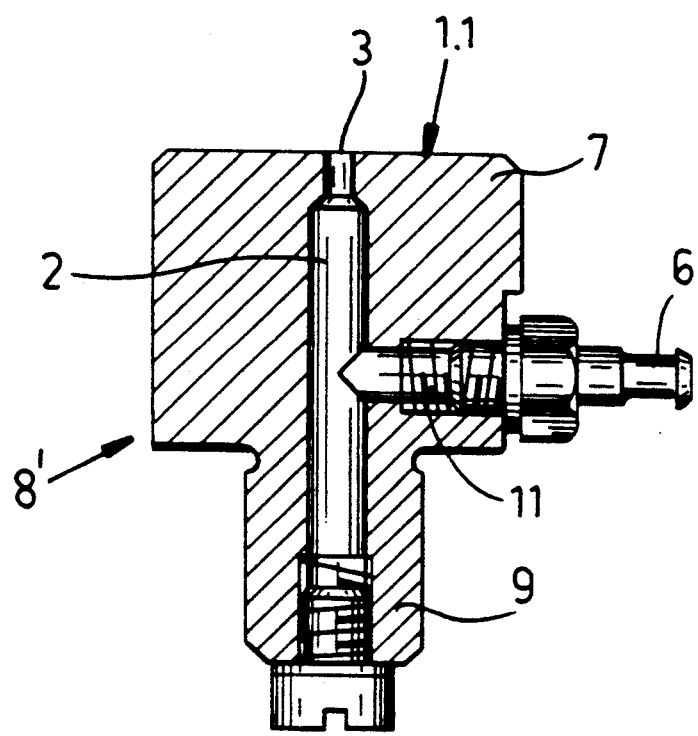
FIG. 3 is a section like FIG. 2C through another detector element in accordance with this invention.

In FIG. 3 another detector plug 8' is shown having a stem 9 adapted to be seated in a hole in the surface S, eliminating the need for the block 7 of FIGS. 2A through 2C.

Figure 4A:
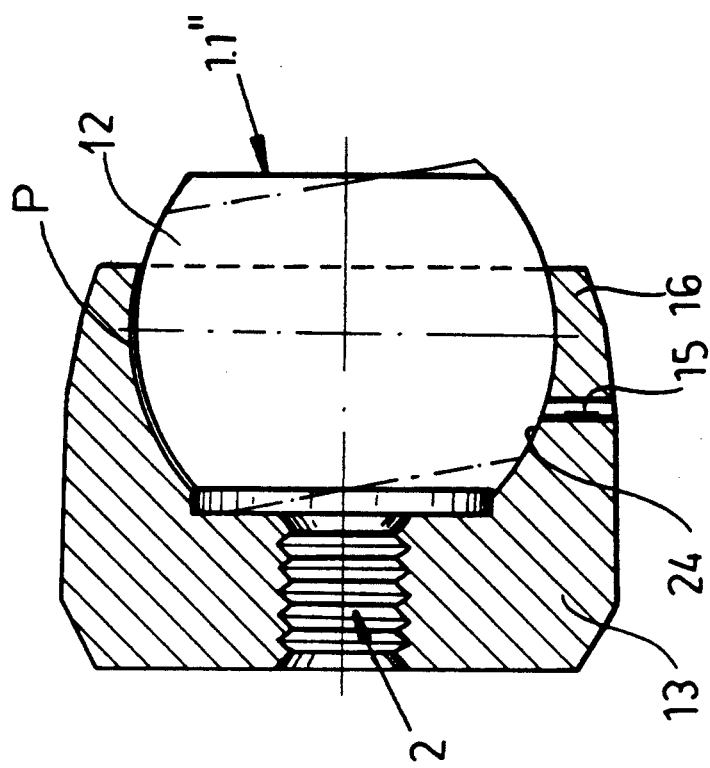
FIGS. 4A and 4B are sections through two more detector elements according to the invention.

FIG. 4A has a body 13 formed with a ball seat 24 of part-spherical shape in which is loosely received a part-spherical blocking body 12 forming a ridged or riffled support surface 1.1', the play being indicated at P. The passage 2 opens into the flat bottom of the seat 24 and a vent passage 15 opens laterally into it and is otherwise open to the atmosphere. When the body 12 is pressed flatly down into the seat 24 the play P is closed up and the body 12 blocks flow from the passage 2 to the vent 15. When not pushed down or canted as illustrated in dot-dashed lines, however, such flow is possible so that the respective hose 4 and feed line 22 will be depressurized.

Figure 4B:
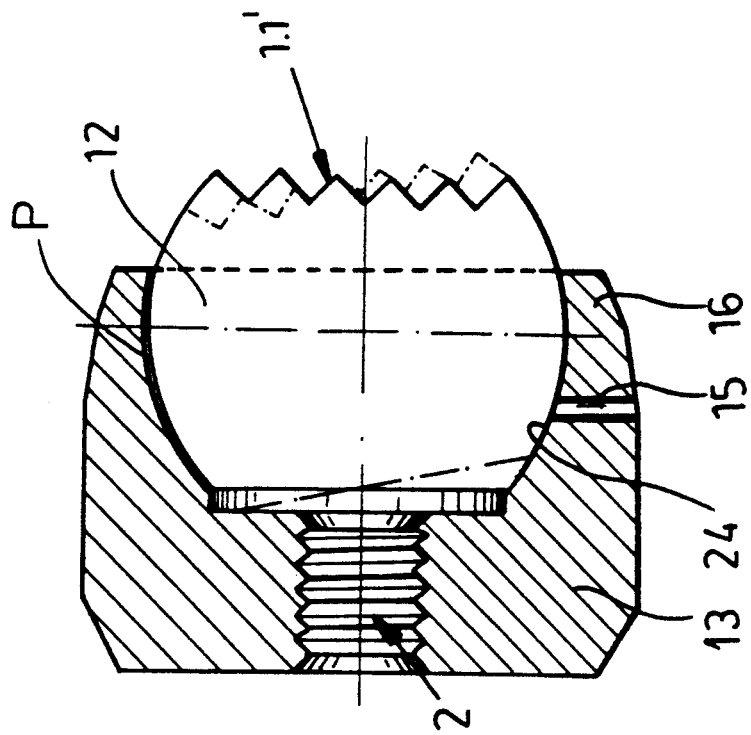

The FIG. 4B arrangement is identical to that of FIG. 4A, except that the body 12 forms a planar surface 1.1''.

I claim:

1. In combination with
a workpiece having a face; and
a support having a surface adapted to engage the workpiece face; a workpiece-position detector comprising:
an element at the surface formed with a passage having a mouth open generally at the surface and blockable by the face of the workpiece, the element passage being L-shaped with one leg forming the mouth and another leg provided with a connection;
a flexible hose connected to the passage of the element at the connection;
a feed line connected to the hose;
pump means connected to the feed line for supplying a gas under pressure to the hose, whereby the gas exits from the passage mouth when same is not blocked;
a restriction in the feed line;
a pressure sensor in the feed line downstream of the restriction producing an output corresponding to pressure in the conduit, whereby when the mouth is blocked the pressure at the sensor is relatively high and when not blocked it is relatively low; and
control means connected to the pressure sensor for taking action when the pressure sensor detects the relatively low pressure.

2. The position detector defined in claim 1 wherein the surface is provided with a plurality of such detectors all connected via respective such hoses and feed lines to the pump means, each such feed line being provided with a respective such restriction and sensor.

3. The position detector defined in claim 1 wherein the passage is restricted at its mouth.

4. The position detector defined in claim 3 wherein the surface has a predetermined area and the mouth has a flow cross section equal to at most about one one-hundredth of the predetermined surface area.

5. In combination with
a workpiece having a face; and
a support having a surface adapted to engage the workpiece face; a workpiece-position detector comprising:
an element at the surface formed with a passage having a mouth open generally at the surface and blockable by the face of the workpiece, the element including
a block formed with the passage and
a plug formed with a central throughgoing passage and having a small-diameter stem fitting snugly in the passage and a large-diameter head projecting from the block and forming part of the surface;
a flexible hose connected to the passage of the element;
a feed line connected to the hose;
pump means connected to the feed line for supplying a gas under pressure to the hose, whereby the gas exits from the passage mouth when same is not blocked;
a restriction in the feed line;
a pressure sensor in the feed line downstream of the restriction producing an output corresponding to pressure in the conduit, whereby when the mouth is blocked the pressure at the sensor is relatively high and when not blocked it is relatively low; and
control means connected to the pressure sensor for taking action when the pressure sensor detects the relatively low pressure.

6. In combination with
a workpiece having a face; and
a support having a surface adapted to engage the workpiece face; a workpiece-position detector comprising:
an element at the surface formed with a passage having a mouth open generally at the surface and blockable by the face of the workpiece, the element being formed with a part-spherical seat and including a part-spherical body having a body face and engaged in the seat, the body being movable between a blocking position with the body face parallel to the surface and blocking flow out of the passage and a vent position with the body face nonparallel to the surface and permitting flow out of the passage;

a flexible hose connected to the passage of the element;

a feed line connected to the hose;

pump means connected to the feed line for supplying a gas under pressure to the hose, whereby the gas exits from the passage mouth when same is not blocked;

a restriction in the feed line;

a pressure sensor in the feed line downstream of the restriction producing an output corresponding to pressure in the conduit, whereby when the mouth is blocked the pressure at the sensor is relatively high and when not blocked it is relatively low; and control means connected to the pressure sensor for taking action when the pressure sensor detects the relatively low pressure.

7. The position detector defined in claim 1 wherein the element is formed with a bleed orifice opening into the seat and communicating the passage in the vent position of the body.

* * * * *